Apr. 10, 1923.

E. J. WADE ET AL 1,450,999

VARIABLE SPEED GEARING FOR MOTOR ROAD AND OTHER VEHICLES

Filed Mar. 25, 1922    2 sheets-sheet 1

INVENTORS.
E. J. Wade & G. W. Jacobs.

Attorney.

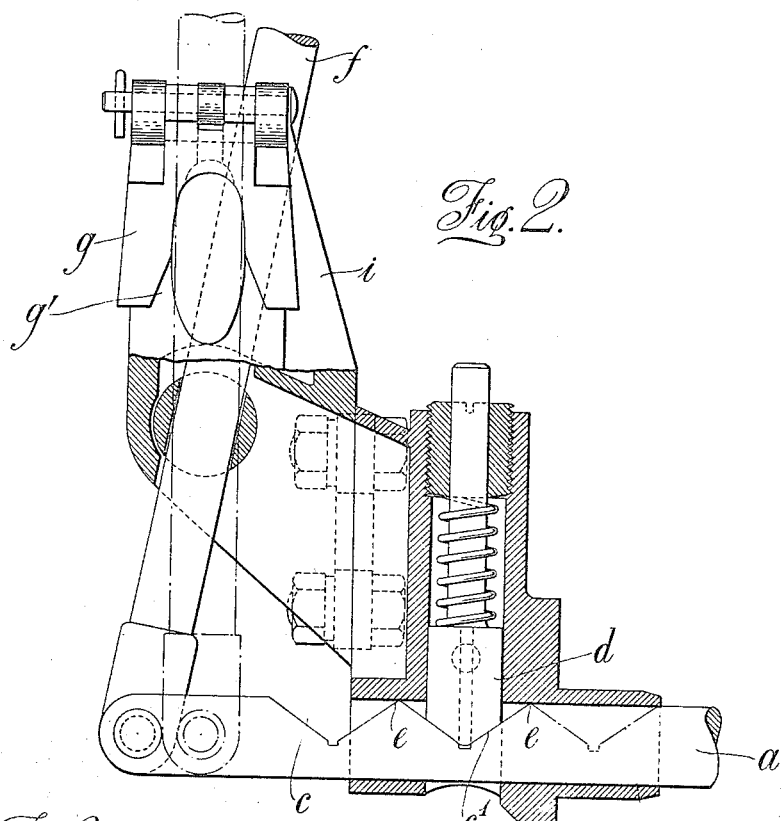
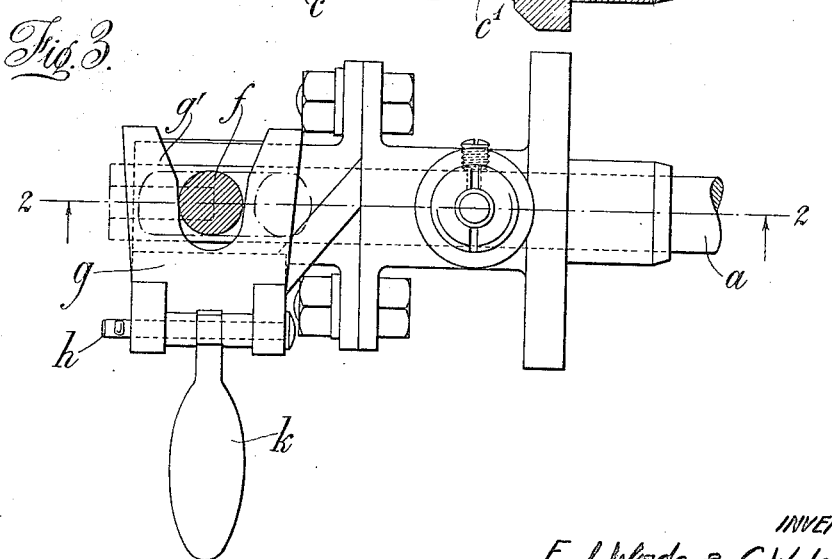

Patented Apr. 10, 1923.

1,450,999

UNITED STATES PATENT OFFICE.

EDWARD JOHN WADE, OF ST. JOHN'S WOOD, AND GEORGE WILLIAM JACOBS, OF PURLEY, LONDON, ENGLAND.

VARIABLE-SPEED GEARING FOR MOTOR ROAD AND OTHER VEHICLES.

Application filed March 25, 1922. Serial No. 546,853.

*To all whom it may concern:*

Be it known that we, EDWARD JOHN WADE and GEORGE WILLIAM JACOBS, subjects of His Majesty the King of England, and residents of St. John's Wood, in the county of London, Kingdom of England, and Purley, in the county of Surrey, Kingdom of England, respectively, have invented certain new and useful Improvements in or Connected with Variable-Speed Gearing for Motor Road and Other Vehicles, of which the following is a specification.

This invention relates to improvements in or connected with variable speed gearing for motor road and other vehicles, and more particularly to improvements in the mechanism employed for effecting changes in the speed ratio between the engine and the back axle of motor vehicles.

With speed gearing for use on motor road vehicles when passing from one combination of gears to another by means of a sliding gear or dogs there must necessarily be an intermediate position between those of full engagement in which the sliding member is entirely out of mesh and the driving and driven shafts are totally disconnected. In gear boxes as at present constructed and employed these disconnected or neutral positions are stable ones; that is to say, the sliding member and change lever will remain in them of their own accord, and this feature is essential to the operation of the car.

When, however, a second or auxiliary gear box is added to increase the number of speed ratios in a vehicle already fitted with one gear box its stable neutral positions involve certain drawbacks if the disconnections or free neutral positions come behind the transmission brake and thereby render the said brake inoperative and it has been discovered that great advantages result from using an auxiliary gear box so designed that the speed changing mechanism cannot ordinarily remain in the neutral position and if specially required to do so must be held there by means of a supplementary device.

Now according to the present invention we provide a second or auxiliary gear box in which the neutral or disconnected positions are normally unstable.

In order that the invention may be clearly understood and readily carried into effect it is hereinafter described with reference to the accompanying drawings, in which:—

Figure 2 is a sectional detail view taken on the line 2—2 of Figure 3 and illustrating a supplementary device employed for the purpose of rendering it possible to obtain a stable or fixed neutral position of the gear;

Figure 3 is a sectional plan view of said device, and

Figure 1:
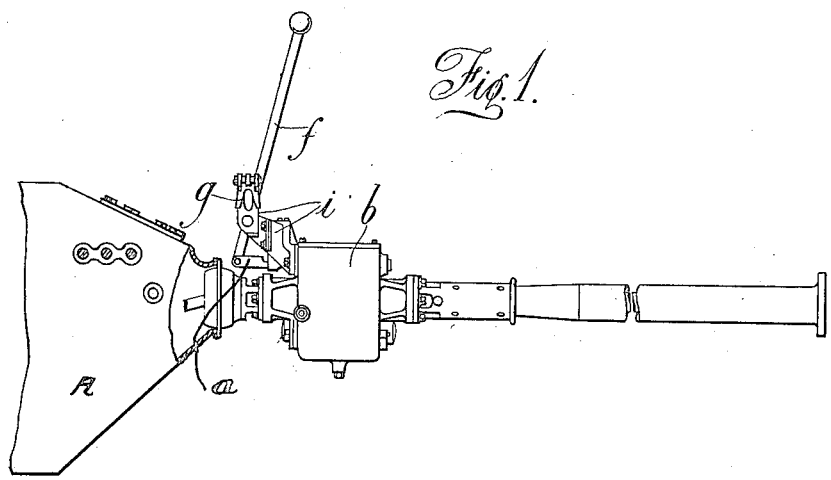
Figure 1 is a side elevation of an automobile drive provided with an auxiliary gear box constructed according to the present invention and having controlling means adapted to render the neutral or disconnected positions of the gear normally unstable, the gear being of what is commonly known as the central control type with the gear box and the control lever close up behind the clutch or engine.
Figure 4:
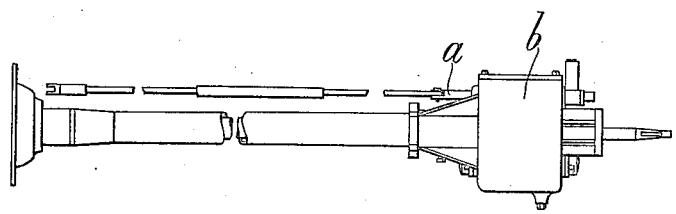
Figure 4 is a plan view of an auxiliary gear box in which an intermediate connecting rod is employed between the selector rod of the gear box and the operating lever.

Fig. 1 of the drawings illustrates an automobile drive having the conventional or main gear box A and the auxiliary gear box $b$ of the present invention. In one very convenient manner of carrying the present invention into effect each selector rod $a$ of the gear box $b$ which through a fork controls the movement of the sliding member of the gear, has its notches or grooves $c$, $c'$, in the bottom of which the spring plunger $d$ is adapted to rest when the sliding member is in full engagement, cut so wide and deep that their adjacent sides meet or almost meet and form an apex or ridge $e$ with little or no flat top to it. Thus in practice when a gear ratio change has to be made and the selector rod $a$ is moved longitudinally by means of the change lever $f$ from one of its positions of engagement its travel is resisted by the downward pressure of the spring plunger $d$ on the sloping side of the groove $c$ tending to return it to the starting point. This continues until the ridge $e$ between the grooves passes under the plunger and then the pressure is at once transferred to the adjacent slope of the second groove and acts in the opposite direction helping to continue the motion of the selector rod until the plunger $d$ reaches the bottom of the groove and the sliding member of the gear is again fully in mesh.

If the grooves $c$ of which there may be two, three, or more as desired, are, as shown, alike in size and shape, the ridges $e$ between them come midway in the path of the change lever and selector rod between one position of engagement and the other but this is not essential and by suitably varying the grooves the ridge may be shifted towards either end of the stroke.

By the use of our novel construction of the selector rod $a$ it is practically impossible for the sliding member of the gear to remain in the disconnected or neutral positions as the pressure of the plunger $d$ at all times tends to carry it either backwards or forwards into full engagement. To obtain the greatest advantage from this arrangement and to ensure that the engagement shall always be easy and immediate we prefer that the dogs and teeth of the engaging members of the gear shall be shaped and arranged as described in our Specification of our British Letters Patent No. 142,032; that is to say, the dogs, teeth, studs or the like are formed or cut away in their width so as to form enlarged entrance gaps.

When a suitable or fixed neutral position is required a supplementary device may be provided at some suitable position such for instance as outside the gear box, as shown in Figure 1, which engages directly with the change lever $f$ and holds it firmly and positively in the neutral position. This device may be constructed in various forms. That now described, and shown in Figures 1, 2 and 3, is one of the simplest and as it cannot come into play accidentally nor be unintentionally disengaged it fulfils the essential requirements. A slotted plate or flap $g$ is hinged at $h$ to a bracket or extension piece $i$ on the gear box or in some other convenient position close alongside the change lever $f$. The position and size of the slot $g'$ are such that when the flap is turned over on its hinge $h$ so as to lie against the lever $f$ the slot $g'$ will, as shown in Figure 3, just slip over the lever as it is moved through the neutral position, shown in dotted lines in Figure 2, and the flap $g$ will fall down and prevent it from shifting backwards or forwards. To release the change lever the flap is, by suitable means such as by the knuckle jointed finger piece $k$, lifted up and swung to the other side of its supporting bracket $i$ where it falls down to one side, as shown in Figure 2, well out of the way. A counterweight, spring or other suitable device may be provided to control and accelerate its motion.

What we claim is:—

1. The combination in a motor vehicle having a gear box, of an auxiliary gear box through which driving motion is communicated, and means cooperating with said auxiliary gear box to render a neutral position of the gears thereof unstable.

2. An auxiliary gear box designed for use in connection with vehicles having a primary gear box, a selector rod for controlling the shifting in said auxiliary gear box, and means whereby the selector rod is normally held against remaining in a neutral position.

3. An auxiliary gear box for use with motor vehicles having a primary gear box, and a selector rod for said auxiliary gear box having interlocking recesses to determine the position of shift of the gears of the auxiliary gear box in the movement of the selector rod, said recesses being arranged to normally prevent a neutral position of said selector rod, and a spring pressed interlocking means to cooperate with said recesses.

4. An auxiliary gear box for use with motor vehicles having a primary gear box, and a selector rod for said auxiliary gear box having interlocking recesses to determine the position of shift of the gears of the auxiliary gear box in the movement of the selector rod, said recesses being arranged to normally prevent a neutral position of said selector rod and being formed so as to avoid a neutral space between them, and an interlocking means cooperating with said recesses.

5. An auxiliary gear box designed for use in connection with vehicles having a primary gear box, a selector rod for controlling the shifting in said auxiliary gear box, and means whereby the selector rod is normally held against remaining in a neutral position, and manually operable means independent of the gear box whereby the selector rod may be held in neutral position at will.

In testimony whereof we have hereunto signed our names.

EDWARD JOHN WADE.
GEORGE WILLIAM JACOBS.